US007388918B2

(12) United States Patent
Stetzler et al.

(10) Patent No.: US 7,388,918 B2
(45) Date of Patent: Jun. 17, 2008

(54) APPARATUS AND METHOD FOR THE TRANSPARENT UPGRADING OF TECHNOLOGY AND APPLICATIONS IN DIGITAL RADIO SYSTEMS USING PROGRAMMABLE TRANSMITTERS AND RECEIVERS

(75) Inventors: Trudy D. Stetzler, Houston, TX (US); Burc A. Simsek, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 854 days.

(21) Appl. No.: 09/802,734

(22) Filed: Mar. 9, 2001

(65) Prior Publication Data

US 2001/0031013 A1 Oct. 18, 2001

Related U.S. Application Data

(60) Provisional application No. 60/188,696, filed on Mar. 13, 2000, provisional application No. 60/255,271, filed on Dec. 13, 2000.

(51) Int. Cl.
*H04L 27/00* (2006.01)

(52) U.S. Cl. ...................................... 375/259; 375/316

(58) Field of Classification Search ................ 375/219, 375/220, 222, 259, 295, 316, 341, 262
See application file for complete search history.

(56) References Cited

U.S. PATENT DOCUMENTS

| | | | | |
|---|---|---|---|---|
| 4,910,510 | A * | 3/1990 | Davis et al. | 340/7.41 |
| 5,042,082 | A * | 8/1991 | Dahlin | 455/437 |
| 5,103,221 | A * | 4/1992 | Memmola | 340/5.31 |
| 5,251,232 | A * | 10/1993 | Nonami | 375/216 |
| 5,444,491 | A * | 8/1995 | Lim | 348/441 |
| 5,550,881 | A * | 8/1996 | Sridhar et al. | 375/377 |
| 5,680,134 | A * | 10/1997 | Tsui | 341/173 |
| 5,841,390 | A * | 11/1998 | Tsui | 341/173 |
| 5,870,675 | A * | 2/1999 | Tuutijarvi et al. | 455/436 |
| 6,005,508 | A * | 12/1999 | Tsui | 341/173 |
| 6,031,867 | A * | 2/2000 | Johnson et al. | 375/222 |
| 6,243,572 | B1 * | 6/2001 | Chow et al. | 455/408 |
| 6,493,325 | B1 * | 12/2002 | Hjalmtysson et al. | 370/261 |
| 6,507,611 | B1 * | 1/2003 | Imai et al. | 375/222 |
| 6,646,993 | B1 * | 11/2003 | Davies et al. | 370/252 |

(Continued)

*Primary Examiner*—Jean B. Corrielus
(74) *Attorney, Agent, or Firm*—Wade J. Brady, III; Frederick J. Telecky, Jr.

(57) ABSTRACT

In a digital radio system including a transmitter unit and at least one receiver unit, changes to the system can implemented without modifying the hardware components by providing the transmitter unit and the receiver unit with processing capability. With respect to the transmitter unit, the principal function of the processing capability is to modify the encoding of the transmitted signal stream. The processing capability of the receiver unit provides the ability to identify when the decoding algorithms are not compatible with the transmitted signal stream. The decoding algorithms of receiver unit can be updated to be compatible with transmitted signals in several different embodiments. According to one embodiment, the updated decoding algorithm can be transmitted to the receiver unit along with, or in place of, the program signal stream. The programmable processor of the receiver unit identifies the decoder algorithm signal stream and installs the decoder algorithm in the programmable processor. In this embodiment of the invention, the upgrade of the receiver unit can be transparent to the user. The upgrade of the receiver unit can also be accomplished by manual intervention by the user.

7 Claims, 8 Drawing Sheets

U.S. PATENT DOCUMENTS 6,671,292 B1 * 12/2003 Haartsen ..................... 370/521
6,693,885 B1 * 2/2004 Sydon et al. ............... 370/337
6,865,233 B1 * 3/2005 Eriksson et al. ............ 375/261
2001/0036174 A1 * 11/2001 Herring ...................... 370/352
2002/0001317 A1 * 1/2002 Herring ...................... 370/493

* cited by examiner

APPARATUS AND METHOD FOR THE TRANSPARENT UPGRADING OF TECHNOLOGY AND APPLICATIONS IN DIGITAL RADIO SYSTEMS USING PROGRAMMABLE TRANSMITTERS AND RECEIVERS

RELATED APPLICATIONS

U.S. provisional application number 60/253,523: APPARATUS AND METHOD FOR RADIO PROGRAM GUIDE CAPABILITY IN A DIGITAL RADIO SYSTEM, invented by Trudy D. Stetzler, Naresh Coppisetti, and Burc A. Simsek, filed on Nov. 28, 2000 and assigned to the assignee of the present application, is a related application; and, U.S. application Ser. No. 09/802,690, now abandoned: Apparatus and method for Global DIGITAL RADIO, invented by Trudy D. Stetzler, Burc A. Simsek, Robert G. DeMoor, Naresh Coppisetti, John H. Gardner, Gene A. Frantz, Carol Ann Levasseur, Aamer Salahuddin, Keith G. Gutierrez, Philip S. Stetson, and Douglas S. Rasor, filed on Mar. 3, 2001 and assigned to the assignee of the present application, is a related application.

BACKGROUND OF THE INVENTION

1. Field of the Invention

This invention relates generally to communication systems and, more particularly, to systems having digital radio transmitters and receivers. When both the radio transmitter and receiver are programmable, the communication systems become much more flexible.

2. Background of the Invention

With the movement of radio broadcast technology toward digital implementation, present efforts are directed to providing consumers with low-cost, high performance receivers that are able to decode the complex digital signals that will be broadcast by the radio stations. Transmitters are burdened with the task of conveying information to the receivers. Once designed and in operation, the transmitters become a static object whose sole function is to convey the digital media to the radio receivers. Because the radio receiver technology has to be designed to be compatible with the radio transmitter, a severe constraint is placed on the receiver design when an upgrade of the entire system is attempted.

Thus, the design of a radio receiver is strongly linked to the architecture of the transmitter because a common coding and modulation scheme is required by both system components. Currently, because of cost and power considerations, a custom ASIC (Application Specific Integrated Circuit) component is frequently used to implement demodulation and decoding algorithms. The ASIC component has all of the limitations inherent in a hardwired component, such as lack of the ability to re-use in the event of even relatively minor changes to the circuit design.

However, data processing components in general have become much more affordable. The general purpose microprocessors (CPUs), the specialized digital signal processors (DSPs), and memory components have participated in the reduction in cost. Consequently, functionality of great complexity can now be considered for radio systems while remaining relatively affordable.

A need has therefore been felt for apparatus and an associated method having the feature that modifications can be made to a digital communication system without requiring changes in the apparatus implementation. It would be a further feature of the apparatus and associated method that the digital transmitter unit of the communication system can be changed by changes to the transmitter unit programming. It would be yet another feature of the apparatus and associated method that the receiver unit of the communication unit can be changed by changes to the receiver unit programming. It would be yet another feature of the apparatus and associated method that communication system upgrades can be performed by changes to the programming of the digital transmitter unit and/or the digital receiver unit. It would be a still further feature of the present invention that the updates to the receiver unit can be provided by the transmitted signal stream.

SUMMARY OF THE INVENTION

The aforementioned and other features can be accomplished, according to the present invention, by providing the transmitter unit and the receiver unit of the digital communication system with programmable processors. The programmable processors permit changes to be made to the transmission of signals from the transmitter unit. For example, the transmitted signals can be encoded in a manner to emphasize selected characteristics. The programmable processor in the receiver unit can then be programmed to interpret correctly the newly reformatted signals from the transmitter unit. The transmitter unit can reprogram the receiver unit by transmitting appropriate signals to the receiver unit. The receiver unit includes apparatus for identifying the transmitted signals as reprogramming signals. Alternatively, the receiver unit can be reprogrammed as part of a service procedure. In either operation, related changes in components are typically not required.

BRIEF DESCRIPTION OF THE DRAWINGS

FIG. 5A is a flow diagram of the activity of a receiver unit is performing a system update using a new decoder algorithm, while

DESCRIPTION OF THE PREFERRED EMBODIMENTS

1 Detailed Description of the Figures

Figure 1:
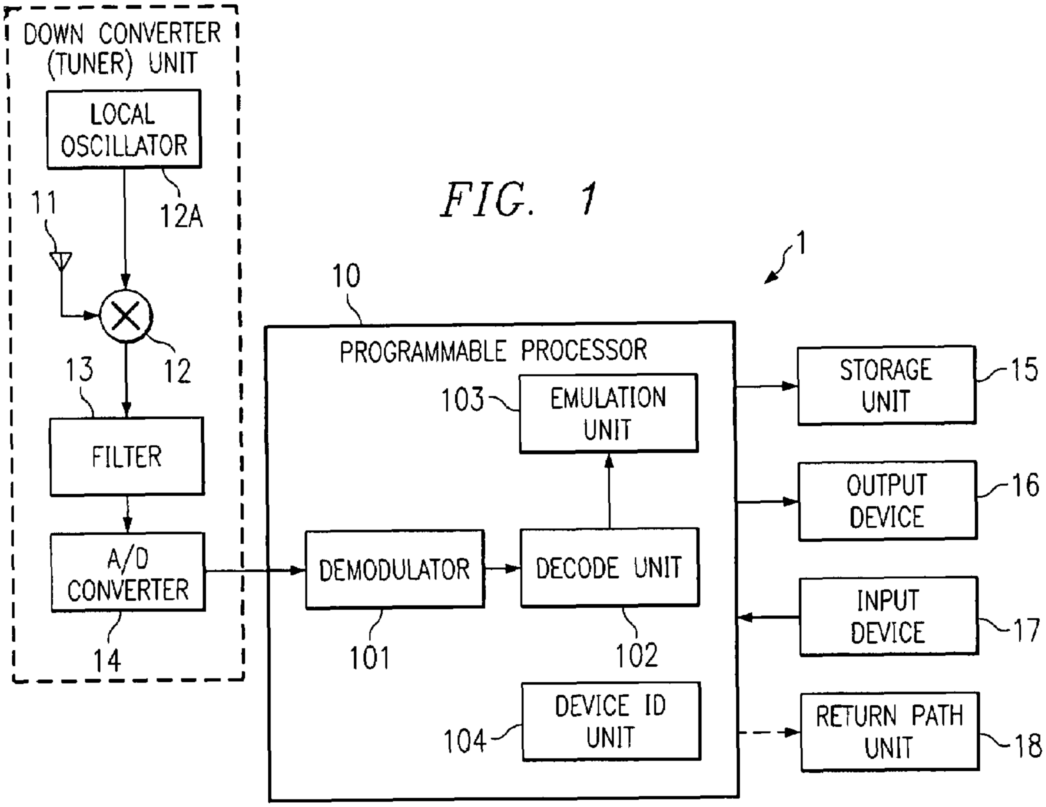
FIG. 1 is a block diagram of a receiver unit for use in the digital radio system according to the present invention.

Referring to FIG. 1, a radio receiver unit for use in a digital radio system 1, according to the present invention, is shown. The radio system 1 includes an antenna 11 for receiving transmitted broadcast signals. The signals from the antenna 11 are applied to a down converter (or tuner) unit 12. The tuner unit 12 receives an output signal from a local oscillator 12A. The output signals from the tuner unit 12 are applied to filter 13. (This filter 13 is used for channel selection in narrowband systems. For broadband systems, this filter 13 would be implemented with an anti-aliasing filter. In the broadband systems, the channel selection, if performed at all, would be performed after the analog-to-digital conversion.) The output signal of the filter is applied analog-to-digital (A/D) converter 14. The output signal from the A/D converter 14 is applied to programmable processor 10. The programmable processor 10 receives signals from an input device 17 and storage unit 15 and applies signals to storage unit 15 and output device 16. The programmable processor 10 is optionally coupled to a return path unit 18. The storage unit 15 can be implemented with compact Flash memory, a disk drive, random access memory (RAM), dynamic random access memory (DRAM), etc. The output device 16 can be implemented with a speaker, a display unit such as a liquid crystal display, etc. The input device 17 can be implemented with a keypad, a screen, smart card, voice-activated unit, etc. The optional return path unit 18 can be implemented with a Bluetooth unit, a cellphone, a satellite communication unit, etc.

Referring once again to FIG. 1, the signals applied to programmable processor 10 are applied to a demodulator unit 101. The demodulator unit can be application specific integrated circuit (ASIC) or hardware components responsive to a software algorithm. The output signal from the demodulator unit 101 is applied to decode unit 102. The decode unit 102 decodes the signals using the technique appropriate to the encoding algorithm (MP3, AAC, MPEG4, etc.). The output signals from the decode unit are applied to the emulation unit 103. The emulation unit 103 formats the signals from the decode unit 102 in a manner appropriate to the receiver 1, i.e., radio, cellphone, web browser, digital radio audio player, recorder, etc. In addition, the programmable processor 10 includes various features that are included in device ID unit 104. These features are security, record protection, authorization, identification, etc.

Figure 2:
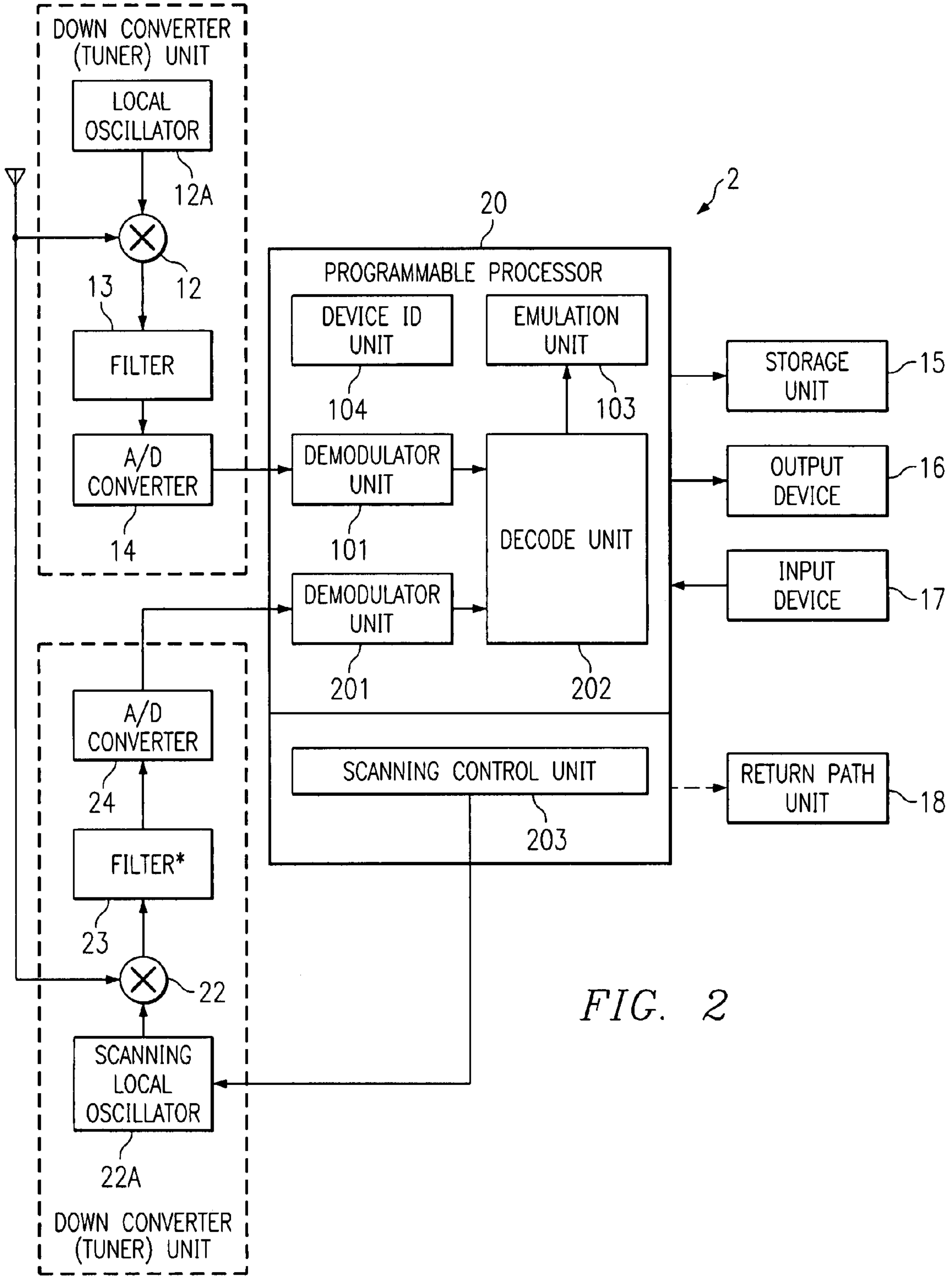
FIG. 2 is a block diagram of alternative radio receiver unit for use in a digital radio system according to the present invention.

Referring to FIG. 2, a block diagram of an alternative implementation of a radio receiver unit 2 according to the present invention is shown. The radio receiver unit 2 includes components that are similar to the components in FIG. 1. An antenna 11 provides a signal to a down converter (tuner) unit 12. Tuner unit 12 also has an output signal from a local oscillator 12A applied thereto. The output signal from tuner unit 12 is applied through filter 13 and through A/D converter 14 to programmable processor 20. Programmable processor 20 includes a demodulator unit 101 to which the signal from A/D converter 14 is applied, a decode unit 202 and an emulation unit 103. The programmable processor 20 also includes a device ID unit 104. Receiving signal from the programmable processor are storage unit 15 and output device 16. Applying signals to the processor are input device 17 and the storage unit 15. The programmable processor 20 can be coupled to an optional return path device 18. In addition, the antenna 11 applies signals to down converter (tuner) unit 22. The tuner 22 receives signals from a scanning local oscillator 22A. The scanning local oscillator 22A operates under the control of scanning control unit 203 that is part of the programmable processor 20. The output signal is applied to filter 23 that, as with filter 13, is a channel selection filter for narrowband systems and is an anti-aliasing filter for broadband systems, the channel selection be performed digitally, if at all, by the programmable processor 20. The output signal of the filter 23 is applied to A/D converter 24, and the output signal of the A/D converter is applied to demodulator unit 201. The output signal of the demodulator unit 201 is applied to decode unit 202.

Figure 3:
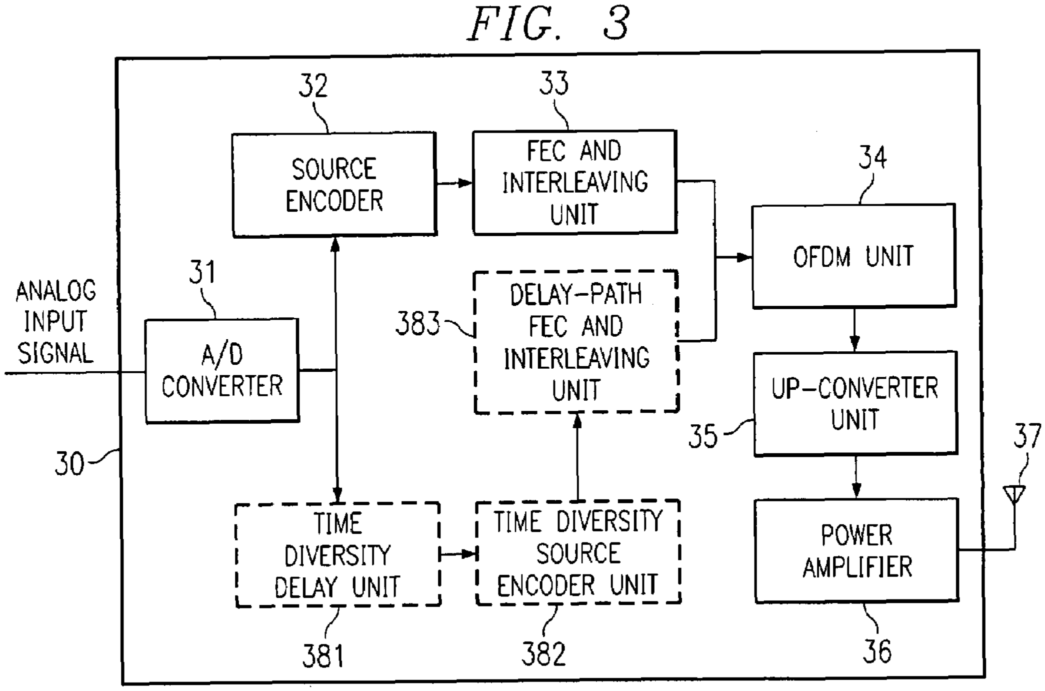
FIG. 3 is a block diagram of the transmitter unit in a digital radio system according to the present invention.

"Referring to FIG. 3, a block diagram of the transmitter unit 30 for use in the digital radio system of the present invention is shown. An analog input signal to be transmitted to a radio receiver unit, e.g. 10 or 20, is applied to analog-to-digital (A/D) converter 31 in transmitter unit 30. The A/D converter 31 digitizes the analog input signal, also known as an input file. The analog input signal/input file can be speech, music, pictures, etc. The digitized input signal from A/D converter 31 is applied to source encoder 32. The source encoder 32 encodes the input file in a format (AAC, MP3, JPEG, etc.) appropriate to the subject matter (video, music, data, etc.) being transmitted. The output signal from the source encoder 32 is applied to the forwarderror-correcting (FEC) and interleaving unit 33. The output signal of the FEC and interleaving unit 33 is applied to the orthogonal frequency division multiplexing (OFDM) unit 34. The output signal of the OFDM unit 34 is applied to the up-converter unit 35 and the output signal of the upconverter unit 35 is, in turn, applied to the power amplifier 36. The output signal of the power amplifier 36 and, consequently, of the transmitter unit 30 is applied to antenna 37 for transmission to receiver units (10 and 20). The transmitter unit 30 can, optionally, also have a time diversity path. The output signal from the .24A A/D converter 31 is applied to time diversity delay unit 381 as well as source encoder 32. (The time diversity delay unit and associated apparatus provide a delayed signal that permits a receiver unit to recover from a signal drop-out such as might occur passing through a tunnel) The output signal from the diversity delay unit 381 is applied to the time diversity source encoder unit 382. The time diversity source encoder 382 performs the same function as the source encoder unit 32 described above. The output signal of the time diversity source encoder unit 382 is applied to the delay-path FEC and interleaving unit 383. The output signal of the delay-path FEC and interleaving unit 383 is applied, along with the output signal from the FEC and interleaving unit 33 to the OFDM unit 34."

Figure 4:
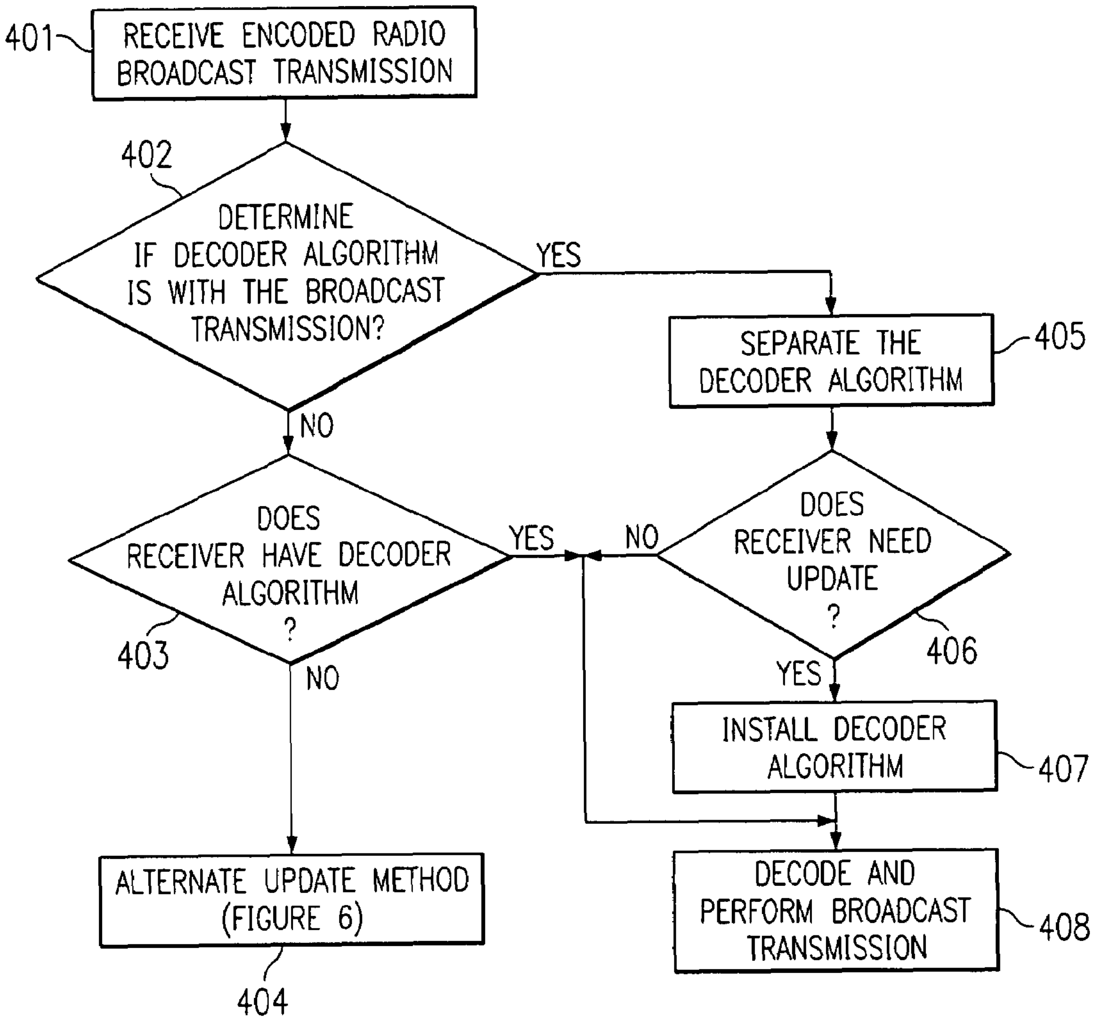
FIG. 4 is a flow diagram of one method for up-dating a radio receiver unit according to one embodiment of the invention.

Referring to FIG. 4, a method of updating a digital radio receiver unit according to one embodiment of the present invention is shown. In step 401, the digital radio receiver receives a continuous, encoded radio broadcast transmission. The broadcast transmission may be encoded speech, music, data video, etc. In step 402, a determination is made whether the decoder algorithm is with the transmitted broadcast transmission. If the decoder algorithm is not with the broadcast transmission, a determination is made in step 403 whether the receiver has the decoder algorithm available. When the decoder algorithm is not available, the alternative update method is employed in step 404 such as is described in FIG. 6. When the decoder algorithm is available in step 403, then the broadcast transmission is decoded and the response, appropriate for the particular type of receiver unit, is performed. When, in step 402, the decoder algorithm has been transmitted with the broadcast transmission, then in step 405, the decoder algorithm is separated from the broadcast transmission. In step 406, a determination is made whether the receiver needs the decoder algorithm update. When, in step 406, a determination is made that the receiver unit does not need the update, then the broadcast transmission is decoded and performed in accordance with the receiver unit in step 404. When, in step 406, a determination is made that the decode algorithm is not available, i.e., the receiver unit needs an update, then, in step 407, the decoder algorithm is installed. Then, after installation of the decode algorithm, the broadcast transmission is decoded and performed according to the type of the receiver unit.

Figure 5A:
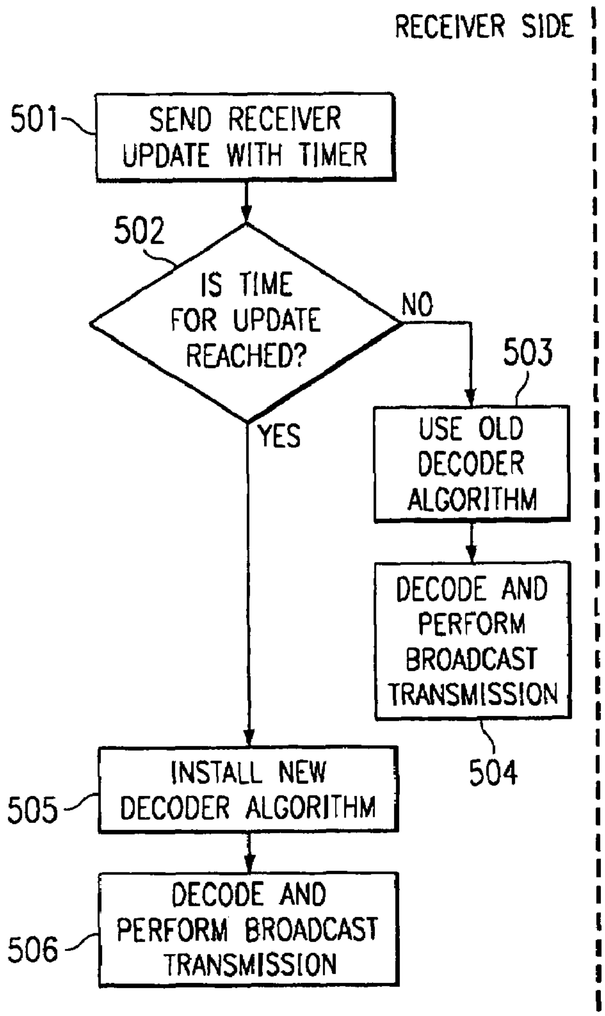

Referring to FIG. 5A, the process for updating the receiver unit according to the present invention is shown. The receiver receives the updated decode algorithm along with timer information as to when the update is to become effective in step 501. In step 502, when each appropriate transmission is received, a determination is made in step 502 whether the time for the updated decoder algorithm to be effective has been reached. When the time for the updated decoder algorithm to be effective has not been reached, then the old decoder algorithm is used to decode the broadcast transmission in step 503. In step 504, the decoded broadcast transmission is performed as indicated by the function of the receiver unit. When, in step 502, the time for the update of the decoder algorithm has been reached, then in step 505, the updated decoder algorithm is installed and the newly installed decoder algorithm is used to decode a broadcast transmission. In step 506, the broadcast transmission is performed as indicated by the type of the receiver unit.

Figure 5B:
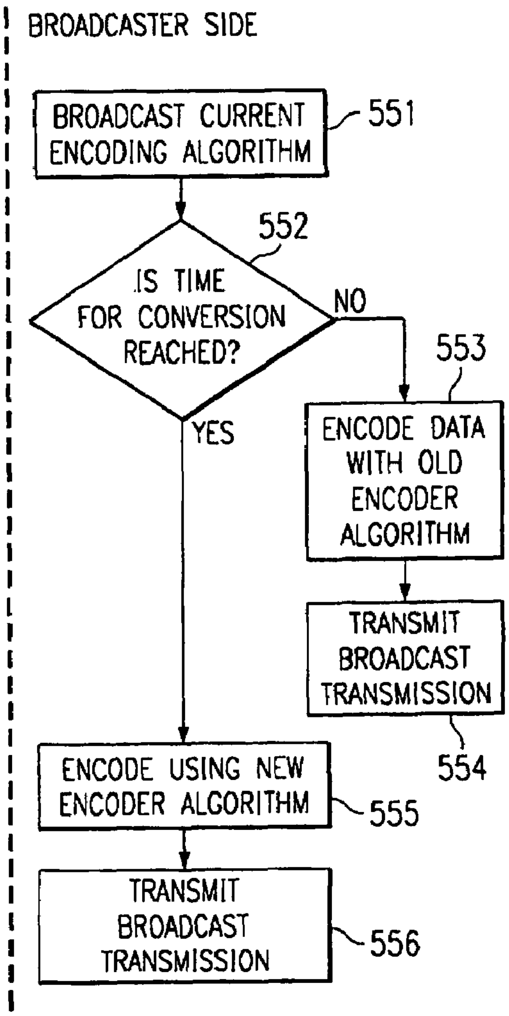
FIG. 5B is a flow diagram of the activity in the transmitter for performing the decode algorithm update.

Referring to FIG. 5B, the process for updating the digital radio system by the transmitter unit is shown. In step 551, a decision is made to broadcast an encoded broadcast transmission. In step 552, a determination is made whether the time for conversion to the new decoder algorithm has been reached. When the time for the conversion has not been reached, then the broadcast transmission is encoded with the old encoder algorithm in step 553. The encoded broadcast transmission is then broadcast in step 554. When, in step 552, the time for conversion to the new encoding technique is identified, then the new encoder is enabled and the broadcast transmission is encoded using the new encoder algorithm in step 555. In step 556, the broadcast transmission encoded with by the updated encoder algorithm is broadcast.

Figure 6:
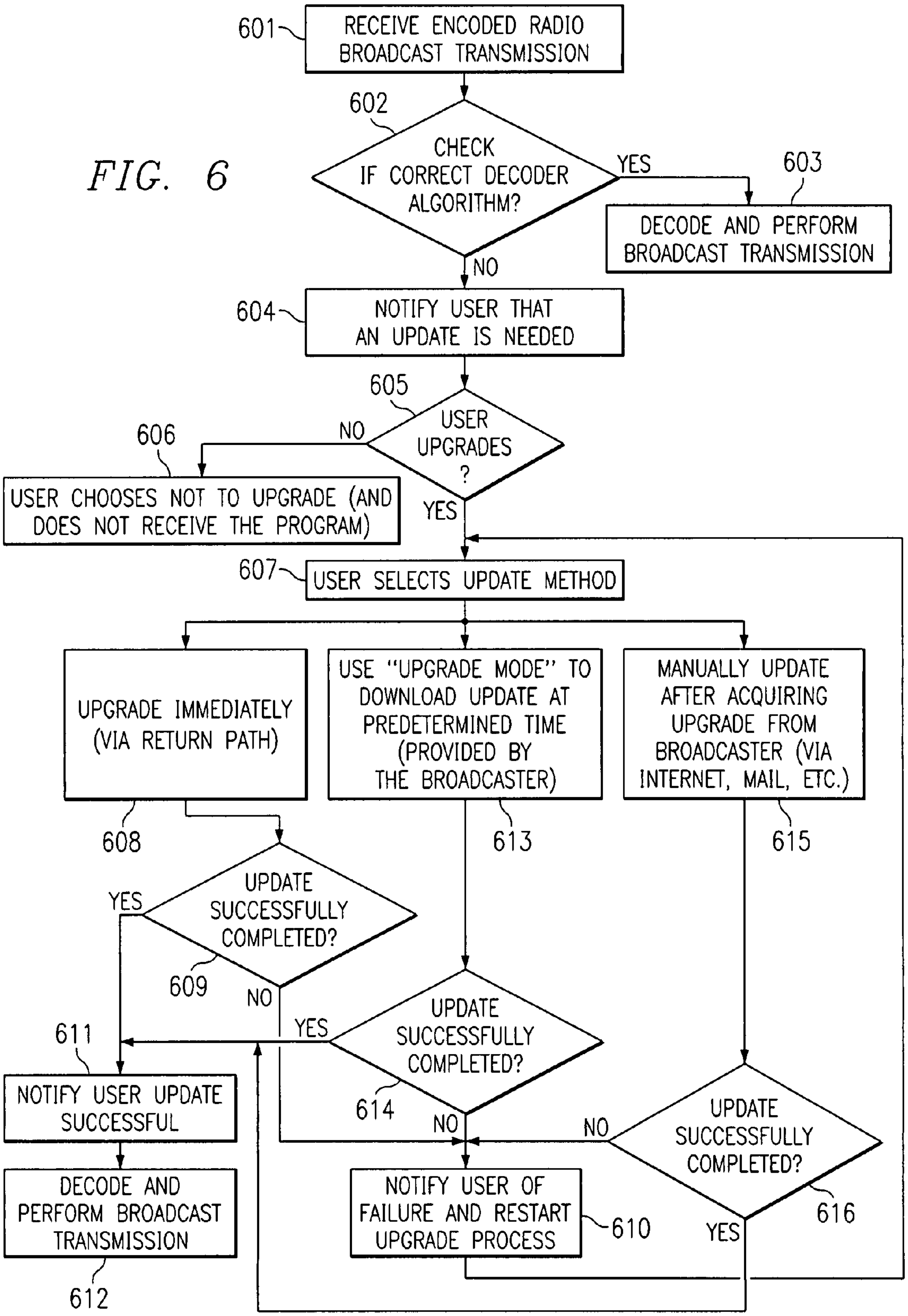
FIG. 6 is flow diagram of a procedure for updating a decoding algorithm after the initial update period has ended according to one embodiment of the present invention.

Referring to FIG. 6, the process for updating a decoding algorithm after the initial upgrade period has ended is illustrated. In step 601, the receiver unit receives an encoded broadcast transmission. In step 602, a determination is made by the programmable processor whether the current decoder algorithm is available. When the current decoder algorithm is available in step 602, the receiver unit decodes the broadcast transmission and performs the decoded broadcast transmission in a manner appropriate for the receiver unit. When, in step 602, the current decoder algorithm is not available, then the programmable processor informs the user that an update of the decoder algorithm is needed. This informing can be done for example via the output device. In step 605, the user makes a decision as to whether to upgrade or not to upgrade the decoder algorithm. When the user chooses not to upgrade the decoder algorithm, in step 606, the broadcast transmission is not available to him. When the user wants to upgrade the decoder algorithm, in step 607, the user selects the method for the upgrade to be implemented. In step 608, the user selects to upgrade immediately. This decision is communicated to the transmitter operator by the return path. The transmitter then broadcasts the decoder algorithm that is detected by the receiver unit and installed in the programmable processor of the receiver unit. In step 609, the programmable processor determines whether installation of the updated decoder algorithm has been successful. When the installation of the decoder algorithm has not been successful, then, in step 610, the user is notified and the upgrade process is restarted by returning to step 607 to select an upgrade method. When, in step 609, the upgrade process has been successfully installed, the user is notified of the successful update of the decoder algorithm in step 611. In step 612, the broadcast transmission is performed in a manner consistent with the receiver architecture. When, in step 607, the user selects the upgrade process in step 613 wherein the upgraded algorithm is broadcast to the user at a preselected time (determined by the transmitter operator). In step 614, a determination is made whether the upgrade of the decoder algorithm was successfully implemented. When the upgrade process was successfully implemented, the process proceeds to step 611. When the upgrade process was not successfully implemented, the process proceeds to step 610. When, in step 607, the user selects the upgrade process of step 615, the updated decoder algorithm is send in a readable media to the user, e.g., via the internet, on a disk, etc. The user then manually upgrades the decoder algorithm. In step 616, a determination is made whether the upgrade was successfully installed. When the upgrade was successfully installed, then the process goes to step 611. When the upgrade of the decoder algorithm is not successful, then the process continues to step 610.

Figure 7:
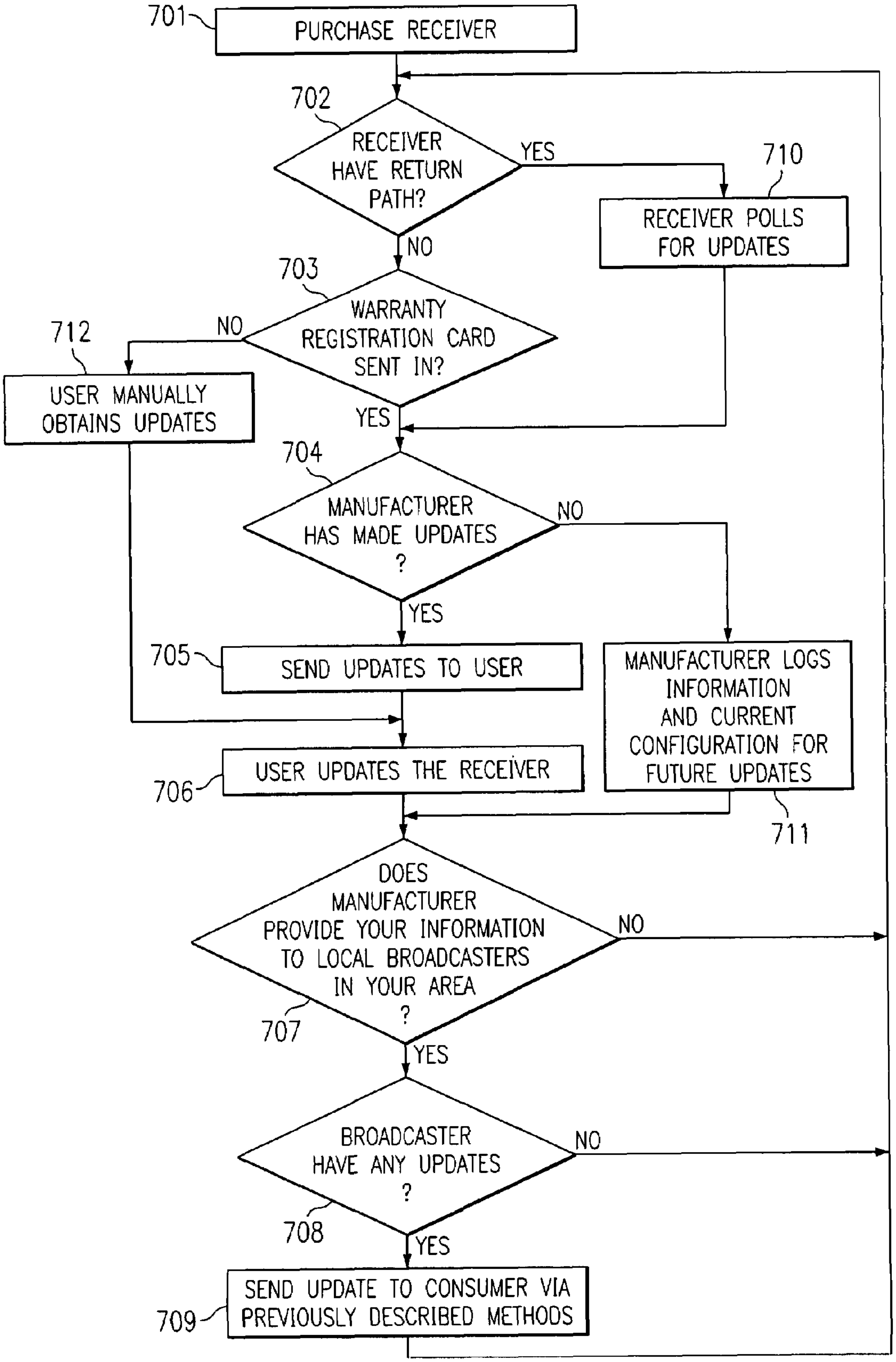
FIG. 7 is flow diagram illustrating how receiver updates can be implemented using a warranty card procedure according to the present invention.

Referring to FIG. 7, a process of providing updates for a receiver unit when a warranty card is returned to the manufacturer is illustrated. In step 701, the user purchases a receiver unit. Then, in step 702, the determination is made whether the receiver unit has return path. When the receiver does not have a return path, then the determination is made whether the warranty card has been submitted in step 703. When the warranty card has been sent in, in step 703, then, in step 704, a determination is made whether the manufacturer has made updates to the receiver unit. When, in step 704, the manufacturer of the radio receiver unit has made updates, then in step 705, the manufacturer sends the updated material to the user. In step 706, the user installs the updates in the receiver unit. In step 707, a determination is made whether the manufacturer of the radio receiver provides the updates to the local broadcast operators. When the manufacturer does not provide updates to the local broadcast operator, then the process returns to step 702. When the manufacture does provide updates to the local broadcast operator, then in step 708, a determination is made whether the broadcast operator has any updates. When the broadcast operator does not have any updates, then the process is returned to step 702. When the broadcast operator does have updates, then the updates are sent of to the user using techniques described in FIG. 6 and the process is returned to step 702. In step 702, when the receiver has a return path, then, in step 710, the receiver unit examines the transmitter unit for updates and proceeds to step 704. When, in step 704, the manufacturer has not made any updates, then, in step 711, the manufacture logs the relevant information and the current configuration to provide updates in the future. After completion of step 711, the process continues in step 707. When in step 703, the warranty registration card is not sent in, then in step 712, the receiver unit user obtains manual updates and uses the manual updates to update the system. The process than continues to step 706.

Figure 8:
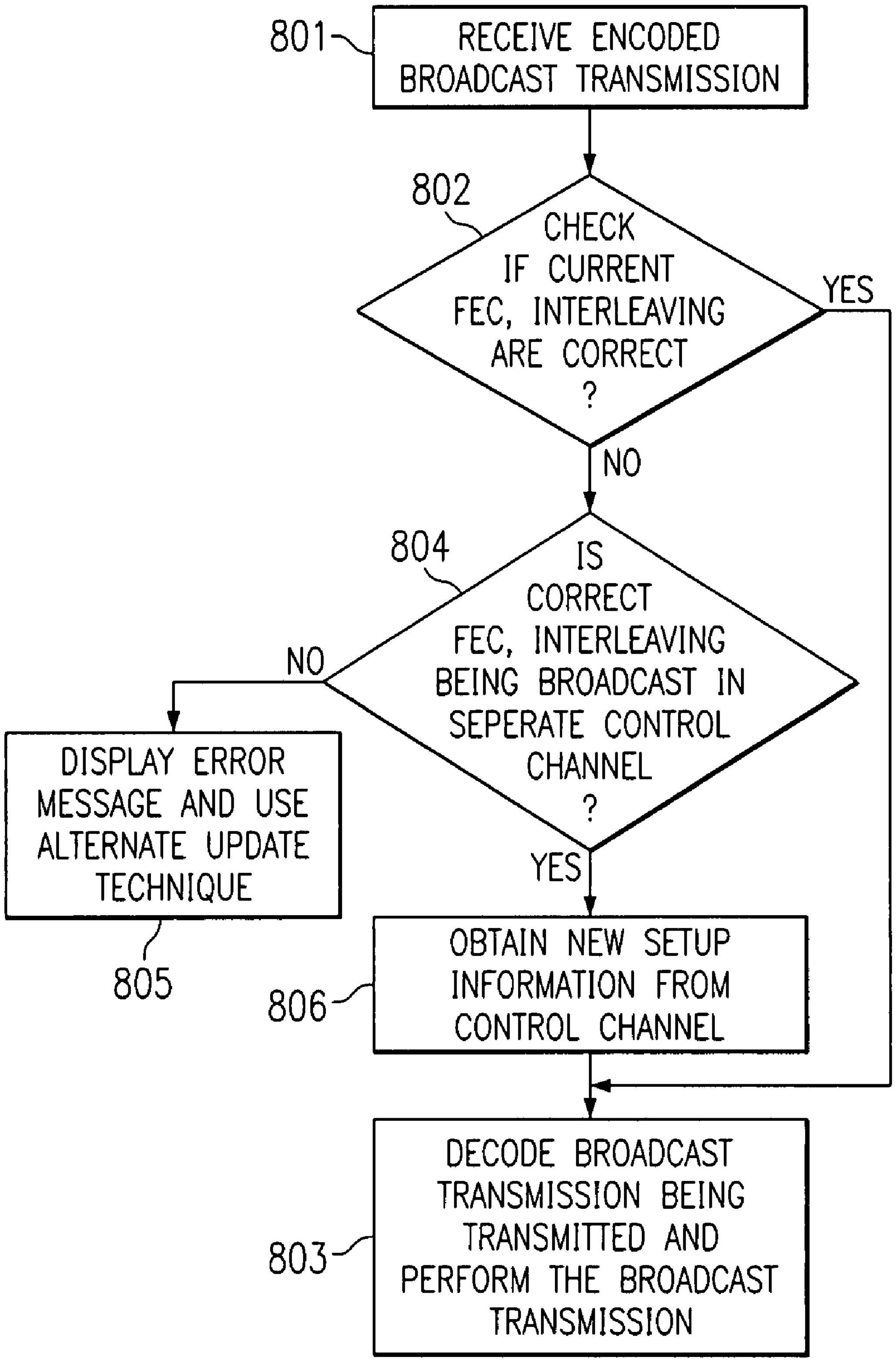
FIG. 8 is a flow diagram illustrating the update of a control channel according to the present invention.

Referring to FIG. 8, an update of the underlying system parameters, also referred to as the transmission format (OFDM spacing, FEC method, interleaving, etc.) is illustrated. In step 801, an encoded broadcast transmission is received by the receiver unit. In step 802, a determination is made whether the current FEC and the interleaving are correct. When the FEC and the interleaving are correct in step 802, then, in step 803, the broadcast transmission is decoded and the encoded source material it contains is decoded and performed in a manner appropriate to the type of receiver unit. When, in step 802, the FEC and the interleaving are not correct, then, in step 804, a determination is made whether the correct FEC and interleaving procedures are being transmitted in and separate control channel. When the correct FEC and interleaving are not being transmitted in a separate broadcast channel, then, in step 805, an error message is displayed and an alternate update procedure is employed to provide the correct decoding procedure. When, in step 804, the correct FEC and interleaving decoding procedures are being broadcast in a separate control channel, then in step 806, the new decoder procedure from the control channel is installed. After installation of the new decoder procedure, the process returns to step 803.

Figure 9:
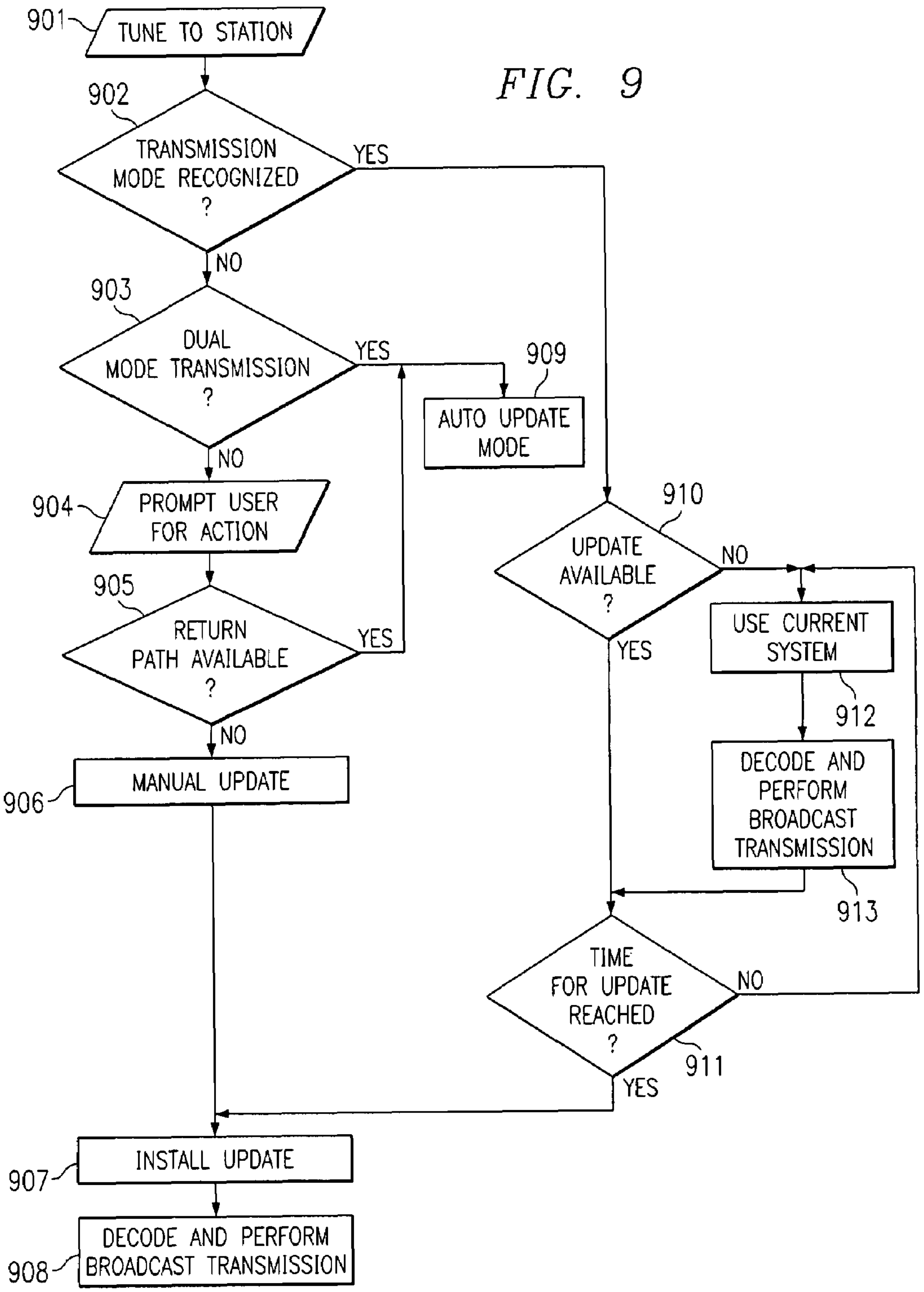
FIG. 9 is flow diagram illustrating a process for updating a radio receiver according to the present invention.

Referring to FIG. 9, a process for updating a radio receiver system according to the present invention is shown. In step 901, the receiver unit is tuned to a transmission. In step 902, a determination is made whether the mode of the transmission is recognized by the radio receiver. When the mode of transmission is not recognized, a determination is made in step 903 if a dual mode of transmission is present for the transmitted signal. When a dual mode is not present, then, in step 904, the receiver prompts the user that action is required on behalf of the receiver unit. A determination is made in step 905 whether a return path to the transmitting unit is available. When a return path is not available, then in step 906 a manual upgrade is obtained. The manual upgrade is then installed in step 907. In step 908, the broadcast transmission is decoded and performed by the receiver unit in step 908. When a dual transmission mode is available in step 903 or when a return path is available to the receiver unit in step 905, then the automatic update mode is entered in step 909. When the transmission mode is recognized in step 902 or after the automatic update mode is entered in step 909, then in step 910, a determination is made whether the update algorithm is available. When the update algorithm is available in step 910, then in step 911 a determination is made whether the time for the system upgrade has been reached. When the time for the upgrade has been reached, then the upgrade algorithm is installed in step 907 and the broadcast transmission is decoded and performed in step 908. When, in step 910, the algorithm update is not available, or in step 911 when the time for the upgrade has not been reached, then, in step 912 the decision to use the current (non-updated) system. In step 913 the broadcast transmission is decoded and performed by the receiver unit. After performance of the broadcast transmission, the process is returned to step 911, but only after the timer has started for the system update.

2. Operation of the Preferred Embodiments

The main constraint involved in the design of next generation receivers is backward compatibility to existing transmitters and transmission formats. The static nature of existing transmitter designs limits the amount of upgrading that can be done to the receiver design since it has to adhere with a system specification that is highly dependent on the transmitter. The use of a programmable transmitter will allow drastic changes to the overall architecture of the broadcast system. After upgrading their transmitters, the broadcaster can then either automatically upgrade the programmable receivers as the changes are made or allow the upgrade to be offered as a service feature. This procedure will eliminate or reduce the cost of upgrading the receiver to users and broadcasters since any upgrade that is programmable in nature will be easily implemented in both the receiver and the transmitter. The concept of having 'programmable' transmitters and receivers, will allow the user and the designers access to not only upgrading the applications that are run on the radios, but also access to the underlying technology of the of digital radio which is the transport medium.

Referring again to FIG. 1, a programmable digital receiver capable of advantageously using the present invention is shown. The tuner portion of the receiver unit is typically set for a specific frequency band (as regulated by the government/FCC), but may contain configurable filters to adjust the bands of operation. The (RF) broadcast signal, once mixed to a proper frequency is digitized by means of an A/D converter. For single or double conversion receiver architectures, channel selection is typically performed by narrow band filters that precede the A/D converter. These filters are typically implemented using analog components that can be controlled digitally. Wide-band architectures digitize the entire frequency spectrum of interest. The receiver units can decode the entire spectrum (with available processing power) or choose a channel (after the A/D converter) by means of digital filters. The digitally encoded data is then decoded by an appropriate decoder algorithm. The programmable processor can emulate other devices when instructed by the received data (for example, by running a Java script). The receiver unit, in addition to the processor RF input devices and the programmable processor, contains an input device that allows the user to set upgrade preferences or manually install upgrade algorithms, an output device, a storage unit, and optionally a return path.

Referring again to FIG. 2, an alternative embodiment of the receiver unit is shown. In this embodiment, a first receiver train applies a signal train from a currently selected broadcast frequency to the programmable processor. A second receiver unit can scan other channels for upgrades (as well as other types of broadcast material) while still providing the original service to the listener.

Referring to FIG. 3, a block diagram of a programmable transmitter is shown. The portions of the digital radio system likely to be changed by the broadcast operator are the source encoding method, and the forward error correction (FEC). The fundamental OFDM spacing can also be changed. The up-conversion (to the final RF broadcast frequency) is typically set by government regulations and would not be changed in real-time by the broadcast operator (every broadcast station would have a different setting of course). Also, while the government sets maximum power levels, the broadcaster may want to transmit at a lower power setting, so the power amplifier can have some limited programmability.

The upgrade to the system can involve two cases. The first type of upgrade is a service upgrade that can be provided by the broadcast operator new services are incorporated in the digital information that it transmits. This upgrade can occur several ways. First, as shown in FIG. 4, as new services are incorporated into the spectrum of the service providers (broadcaster operators), the application or feature update that is required to use the new service can be transmitted along with the service. In the event the user already has the most recent version of the application installed on their radio, no upgrade is required and the application and service is run automatically. In the second instance illustrated in FIG. 5, the service providers (broadcasters) could broadcast the new application for a time period prior to the release of a new service. For example, the service providers would announce a new product and have the upgrade algorithm available for 30 days prior to the service. The upgrade algorithm can be transmitted with a time stamp so that it is installed when the new service is available (or it could install immediately and be saved in local memory in the receiver unit).

In the event the receiver unit was not turned on to receive the update algorithm, a program in the programmable processor detects that an unplayable service is being applied to the programmable processor, and processor provides the user with a message for the user to specify whether the user want to upgrade the receiver. This process is shown in FIG. 6.

If the receiver unit is equipped with a return path (via cell-phone, satellite, etc.) then the receiver unit can automatically register its serial number with the service provider (or the manufacturer) and can provide a list of its current decoder algorithms currently installed at the time of registration. The service provider would then know the currently installed decoder algorithms and can determine if an update is required by the receiver unit. This process is shown in FIG. 7.

As will be clear, the broadcast operator/service provider can transmit in dual modes, i.e., the current mode of broadcast file transmission and the updated mode of broadcast file transmission, for a period of time until all receivers were updated. Note that receiver units could be equipped with an "upgrade mode", wherein the receiver units scan for updates transmitted by the service provider when the receiver unit is not in use by the user. When a warranty card is provided to the manufacturer, all broadcaster operator/service providers in your area could be notified of the receiver unit configuration. The broadcast operators/service providers are able to identify required receiver unit upgrades. The broadcast operators/service providers can then notify receiver unit user of needed upgrades. Similarly, the receiver unit manufacturer can be aware of the installed updates required in local broadcast area, and can forward updates to the receiver unit user. This procedure is illustrated in FIG. 7. (The broadcast operators/service providers can upgrade the receivers units automatically or can offer the upgrades as a service to the customer.)

Referring to FIG. 8, the procedure for upgrading the transmitter unit of the digital radio system is shown. Advances in algorithms, data encoding methods, error correction techniques, and other technological advances will improve and enable system enhancements such as better multi-path performance, higher data rates, lower noise, better audio quality, etc. These changes can be broadcast to the receiver units that are already in service and incorporated to the ones that are still in the process of being designed. The fundamental problem with a system upgrade at the transmitter unit is that the demodulation process is changed. The receiver cannot receive an update if the station is broadcasting in the new format. However the techniques discussed for the receiver unit upgrades can also be incorporated herein. An additional technique that may be incorporated is the use of a dual mode transmission. In dual mode transmission, one station can broadcast to signal streams that can be separated by the receiver unit. With this capability, the current receivers can tune to a lower data rate transmission (i.e., a wider OFDM spacing than in the new system) which is still in the format that they can decode and receive the update that is required. The appropriate transmission standard could be downloaded to the programmable receiver unit at the start of delivery of the program or service (so update FEC codes and interleaving would be similar to the current flow charts). Alternatively, a separate control channel could be used to update the FEC and interleaving as shown in FIG. 8. This method could also be used to download encoder updates as well.

Referring once again to FIG. 9, an update flowchart for a receiver out in the field is shown. The manual update mode shown in step 906 includes the user upgrading the system with software received by the internet, mail, etc. For this upgrade to be possible, the receiver unit manufacturers have to provide receiver units with the appropriate upgrade capability. This capability can be provided by a USB port, a CD player unit, compact flash, or other media device in the receiver unit itself. All transmitters need not be upgraded at the same time or with the same enhancements, or for that matter, not all transmitters need to be originally configured the same. One broadcast operator/service provider can chose a method of data encoding and transmission which enhances the data rate capabilities of the system, while another broadcast operator/service provider can emphasis the audio quality at the expense of data rate transmissions. When all transmitter units in an area are switching to a new format, the upgrades could be scheduled for a specific time period or transmitted continuously on a dedicated upgrade frequency to upgrade all receivers in the area. Manual upgrades could be used to supplement this upgrade process as well.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A digital radio system, comprising:

a transmitter unit, the transmitter unit including a transmitter programmable processor, wherein a signal stream transmitted by the transmitter unit is encoded with an encoding algorithm installed in the transmitter programmable processor; and at least one receiver unit, the receiver unit including:

apparatus for receiving the signal stream transmitted by the transmitter unit and converting the signal stream into a digital format signal stream;

identification apparatus, the identification apparatus determining when an updated decoding algorithm decoding the digital format signal stream is installed in the receiver unit; and a receiver programmable processor for decoding the digital format signal stream using the updated decoding algorithm installed in the receiver programmable processor, the receiving unit requesting the updated decoding algorithm when the updated decoding algorithm is not installed in the receiving unit.

2. The digital radio system as recited in claim 1 wherein the updated decoding algorithm is broadcast in a broadcast transmission control channel to update the receiver unit.

3. The digital radio system as recited in claim 1 wherein a dual transmission mode is used to update the receiver unit.

4. The digital radio system as recited in claim 3 wherein the dual transmission mode includes transmission of an old transmission format and the updated transmission format simultaneously.

5. The digital radio system as recited in claim 1 wherein the updated decoding algorithm is provided by one provider selected from the group consisting of the manufacturer of the receiver unit and the transmitter unit.

6. A digital radio receiver unit responsive to a signal stream from a transmitting unit, the receiver unit comprising:

an antenna for receiving a signal stream from the transmitting unit;

a receiver circuit for converting the signal stream to a digital signal stream;

a programmable processor for processing the digital signal stream, the programmable processor including a decoding algorithm for decoding the digital signal stream; and an output device wherein, when the programmable processor determines that an updated decoding algorithm needed to decode the digital signal stream is not installed therein, the output device providing status signals indicating that the updated decoding algorithm is not present, the status signals causing the updated decoding algorithm to be installed in the programmable processor.

7. The receiver unit as recited in claim 6 wherein the decoding algorithm is an algorithm for decoding a transmitted signal format.

* * * * *